United States Patent
Tsai et al.

(10) Patent No.: US 10,520,062 B2
(45) Date of Patent: Dec. 31, 2019

(54) CYCLOID SPEED REDUCER

(71) Applicant: DELTA ELECTRONICS, INC., Taoyuan (TW)

(72) Inventors: Ching-Hsiung Tsai, Taoyuan (TW); Jia-Ming Wu, Taoyuan (TW); Yu-Xian Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 25 days.

(21) Appl. No.: 15/964,362

(22) Filed: Apr. 27, 2018

(65) Prior Publication Data

US 2018/0320759 A1 Nov. 8, 2018

Related U.S. Application Data

(60) Provisional application No. 62/500,641, filed on May 3, 2017.

(30) Foreign Application Priority Data

Apr. 11, 2018 (TW) .............................. 107112454 A

(51) Int. Cl.
*F16H 1/32* (2006.01)
*F16H 55/34* (2006.01)
(Continued)

(52) U.S. Cl.
CPC .............. *F16H 1/32* (2013.01); *F16H 55/34* (2013.01); *F16H 57/022* (2013.01); *F16H 2001/325* (2013.01); *F16H 2057/0224* (2013.01)

(58) Field of Classification Search
CPC .......... F16H 1/32; F16H 55/34; F16H 57/022; F16H 2001/325; F16H 2057/0224; F16H 29/04; F16H 29/06
See application file for complete search history.

(56) References Cited

U.S. PATENT DOCUMENTS 5,655,985 A * 8/1997 Herstek ..................... F16H 1/32
                                                            475/179
5,908,372 A * 6/1999 Janek ........................ F16H 1/32
                                                            477/162
(Continued)

FOREIGN PATENT DOCUMENTS

CN          2522672 Y     11/2002
CN        104728351 A      6/2015
(Continued)

*Primary Examiner* — Tinh T Dang
(74) *Attorney, Agent, or Firm* — Kirton McConkie; Evan R. Witt

(57) ABSTRACT

A cycloid speed reducer includes two rotating disc assemblies. Each rotating disc assembly includes two cycloid discs. In other words, the cycloid speed reducer has four cycloid discs to be contacted with the corresponding rollers. Consequently, the load withstood by each cycloid disc is reduced. Since the cycloid speed reducer has stronger structural strength, the cycloid speed reducer can be applied to the high-load circumstance. Moreover, an eccentric assembly of the eccentric device includes plural eccentric cylinders. The eccentric cylinders are installed within the axle holes of the corresponding cycloid discs. Due to the plural eccentric cylinders, the eccentric direction of two cycloid discs is opposite to the eccentric direction of the other two cycloid discs. Consequently, it is not necessary to install an additional weight compensation device in the cycloid speed reducer to compensate the dynamic equilibrium.

16 Claims, 11 Drawing Sheets

(51) Int. Cl.
*F16H 57/022* (2012.01)
*F16H 29/04* (2006.01)
*F16H 29/06* (2006.01)

(56) References Cited

U.S. PATENT DOCUMENTS 8,403,789 B2 * 3/2013 Janek .................. F16H 1/32
 475/116
2016/0053871 A1 * 2/2016 Fecko ................. F16H 3/70
 475/168

FOREIGN PATENT DOCUMENTS

| | | |
|---|---|---|
| DE | 102013020363 A1 | 7/2014 |
| JP | S4924260 B1 | 6/1974 |
| JP | H02138538 A | 5/1990 |
| JP | H0771540 A | 3/1995 |

* cited by examiner

CYCLOID SPEED REDUCER

CROSS-REFERENCE TO RELATED APPLICATION

This application claims the benefit of U.S. Provisional Application No. 62/500,641 filed on May 3, 2017, and entitled "SPEED REDUCER", the entirety of which is hereby incorporated by reference. This application also claims the priority to Taiwan Patent Application No. 107112454 filed on Apr. 11, 2018, and entitled "CYCLOID SPEED REDUCER", the entirety of which is hereby incorporated by reference.

FIELD OF THE INVENTION

The present invention relates to a speed reducer, and more particularly to a cycloid speed reducer with high rigidity and capable of achieving dynamic equilibrium.

BACKGROUND OF THE INVENTION

Generally, a motor is operated at a high speed and a low torsion force. In other words, it is difficult to drive a large-sized load. Consequently, for allowing the motor to drive a heavy object, a speed reducer is used for reducing the rotating speed of the motor and increasing the torsion force.

Conventionally, the speed reducers are classified into several types, including rotary vector (RV) reducers, harmonic drive reducers and cycloid speed reducers. For example, the RV-E series reducer is a two-stage speed reducer produced by Nabtesco. The RV-E series reducer comprises a first speed reduction stage with a spur gear and a second speed reduction stage with an epicyclic gear. The gears of the first speed reduction stage and the second speed reduction stage are made of metallic material. The RV-E series reducer is a two-stage reduction design to reduce vibration and inertia while increasing ratio capabilities. The RV-E series reducer provides high-end performance in highly rigidity and high reduction ratio configurations, and the rolling contact elements of the RV-E series reducer have high efficiency and long life. However, since the RV-E series reducer has larger volume and weight and has many components, the cost of the RV-E series reducer is high.

The harmonic drive reducer comprises a wave generator, a flex gear and a rigid gear. The elastic deformation of the flexible gear can be controlled to result in a pushing action so as to transmit motion and power of mechanical transmission. The harmonic drive reducer has smaller size, lighter weight and higher precision when compared with the RV reducer. However, since the rigidity of the flex gear of the harmonic drive reducer is low, the harmonic drive reducer is unable to withstand high impact and has a problem of causing teeth difference friction. In other words, the use life of the harmonic drive reducer is shorter. Moreover, since the input speed of the harmonic drive reducer is not high, the reduction ratio of the harmonic drive reducer is lower.

Conventionally, a cycloid speed reducer comprises an eccentric shaft and two cycloid discs. Each of the two cycloid discs comprises at least one tooth. Moreover, the two cycloid discs are linked with a power input shaft and a power output shaft, respectively. During operations of the cycloid speed reducer, one cycloid disc is rotated with the power input shaft through the eccentric shaft, and the power output shaft is rotated with the other cycloid disc. Through the corresponding tooth structures, the two cycloid discs are correspondingly rotated. The conventional cycloid speed reducer has many benefits such as high transmission ratio, compact structure and high transmission efficiency. However, in case that the conventional cycloid speed reducer is applied to a high-load circumstance, the two cycloid discs of the conventional cycloid speed reducer have to withstand high load. If the cycloid discs have insufficient structural strength, the cycloid discs are possibly damaged and thus the cycloid speed reducer is abnormal. Moreover, because of the eccentric shaft, the rotation of the conventional cycloid speed reducer is deflected in a specified direction. For compensating the dynamic equilibrium, the conventional cycloid speed reducer is additionally equipped with a weight compensation device. If the dynamic equilibrium is not effectively compensated, the conventional cycloid speed reducer generates obvious vibration.

Therefore, there is a need of providing a cycloid speed reducer with the characteristics of a RV reducer and a harmonic drive reducer and capable of achieving high reduction ratio, high rigidity and dynamic equilibrium in order to the overcome the above drawbacks.

SUMMARY OF THE INVENTION

An object of the present invention provides a cycloid speed reducer. By the cycloid speed reducer of the present invention, the problems of the conventional RV reducer (e.g., high volume, weight and cost) and the problems of the conventional harmonic drive reducer (e.g., the deformation of the flex spline and the teeth difference friction) will be overcome. In addition, the cycloid speed reducer of the present invention is capable of achieving high rigidity and dynamic equilibrium.

In accordance with an aspect of the present invention, there is provided a cycloid speed reducer. The cycloid speed reducer includes an eccentric device, a first roller assembly, a second roller assembly, a first rotating disc assembly and a second rotating disc assembly. The eccentric device includes a rotating shaft and an eccentric assembly. The eccentric assembly is eccentrically fixed on the rotating shaft and arranged between a first end and a second end of the rotating shaft. As the rotating shaft is rotated, the eccentric assembly is eccentrically rotated relative to an axle center of the rotating shaft. The first roller assembly includes a first wheel disc and plural first rollers. The plural first rollers are disposed on the first wheel disc. The second roller assembly includes a second wheel disc and plural second rollers. The plural second rollers are disposed on the second wheel disc. The first rotating disc assembly is installed on the eccentric assembly and rotated with the eccentric assembly, and includes a first cycloid disc and a second cycloid disc. The first cycloid disc is arranged beside the first wheel disc. The first cycloid disc comprises at least one first outer tooth. The at least one first outer tooth is contacted with the at least one corresponding first roller. The second cycloid disc is arranged beside the first cycloid disc. The second cycloid disc and the first wheel disc are located at two opposite sides of the first cycloid disc. The second cycloid disc includes at least one second outer tooth. The at least one second outer tooth is contacted with the at least one corresponding first roller. The second rotating disc assembly is installed on the eccentric assembly and rotated with the eccentric assembly, and includes a third cycloid disc and a fourth cycloid disc. The third cycloid disc is arranged between the second cycloid disc and the second wheel disc. The third cycloid disc includes at least one third outer tooth. The at least one third outer tooth is contacted with the at least one corresponding second roller. The fourth cycloid disc is arranged between the third cycloid disc and the second wheel disc. The fourth cycloid disc includes at least one fourth outer tooth. The at least one fourth outer tooth is contacted with the at least one corresponding second roller.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
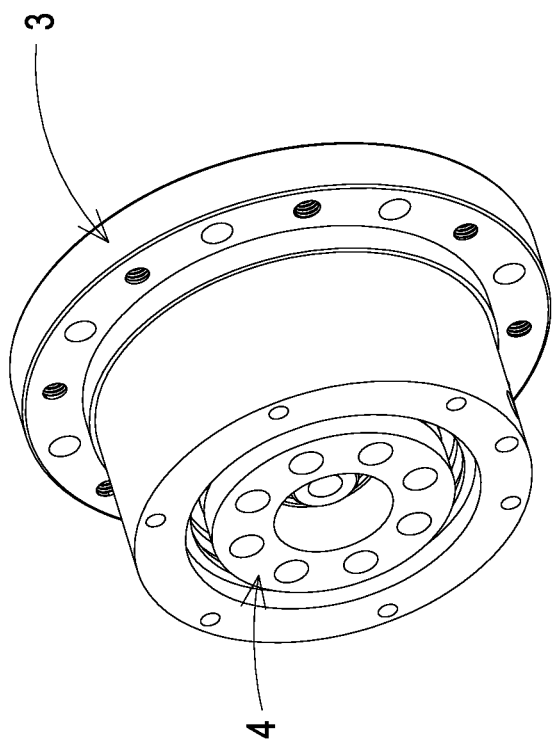
FIG. 1 is a schematic assembled view illustrating a cycloid speed reducer according to a first embodiment of the present invention.
Figure 2:
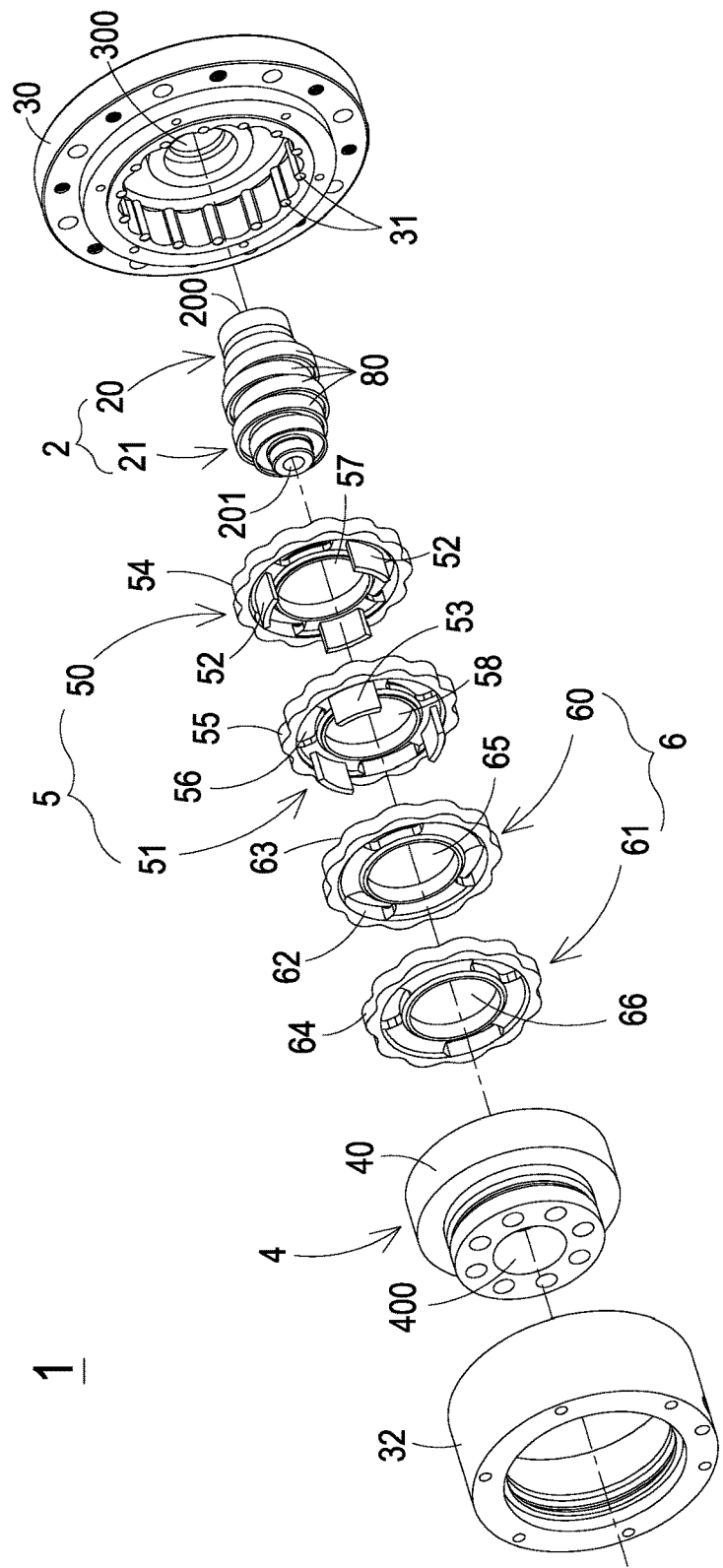
FIG. 2 is a schematic exploded view illustrating the cycloid speed reducer of FIG. 1 and taken along a viewpoint.
Figure 3:
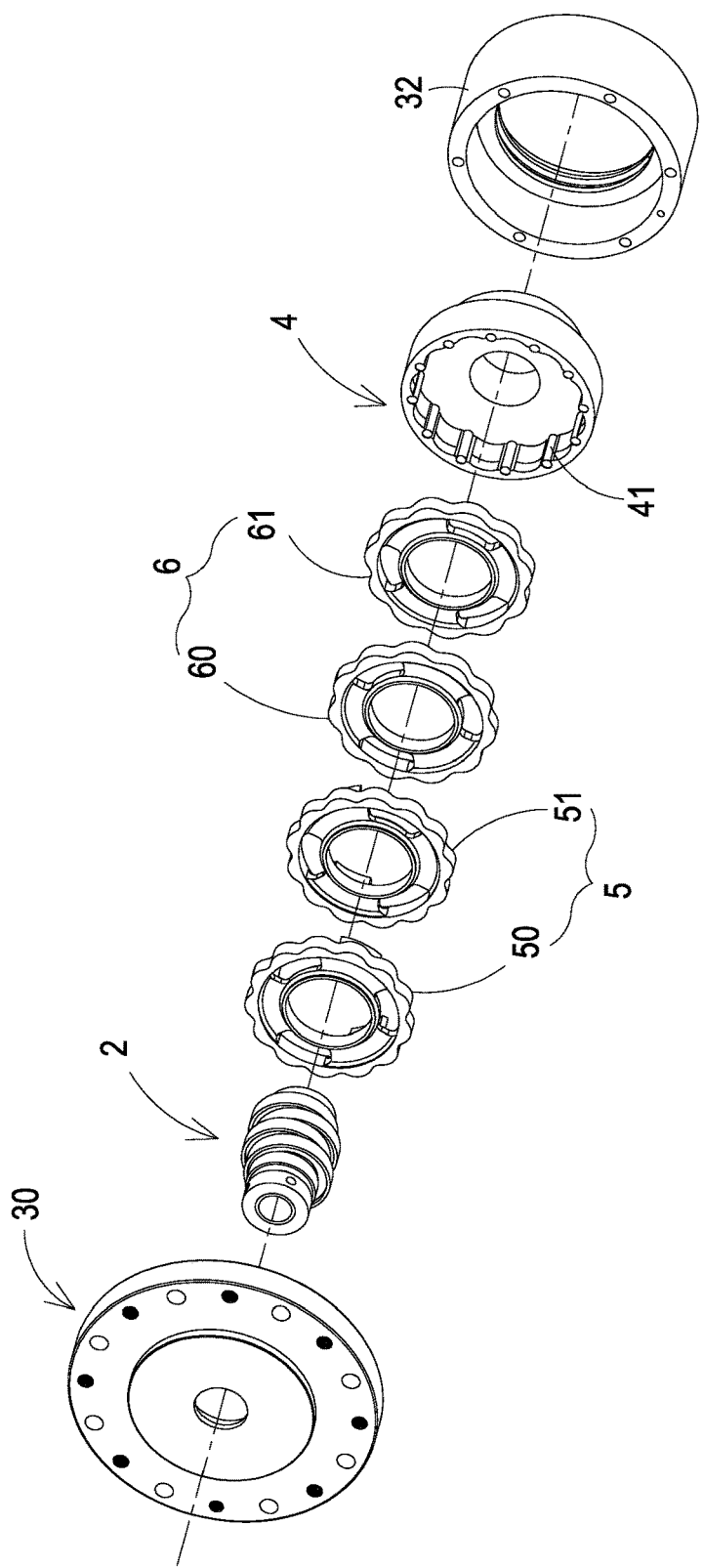
FIG. 3 is a schematic exploded view illustrating the cycloid speed reducer of FIG. 1 and taken along another viewpoint.
Figure 4:
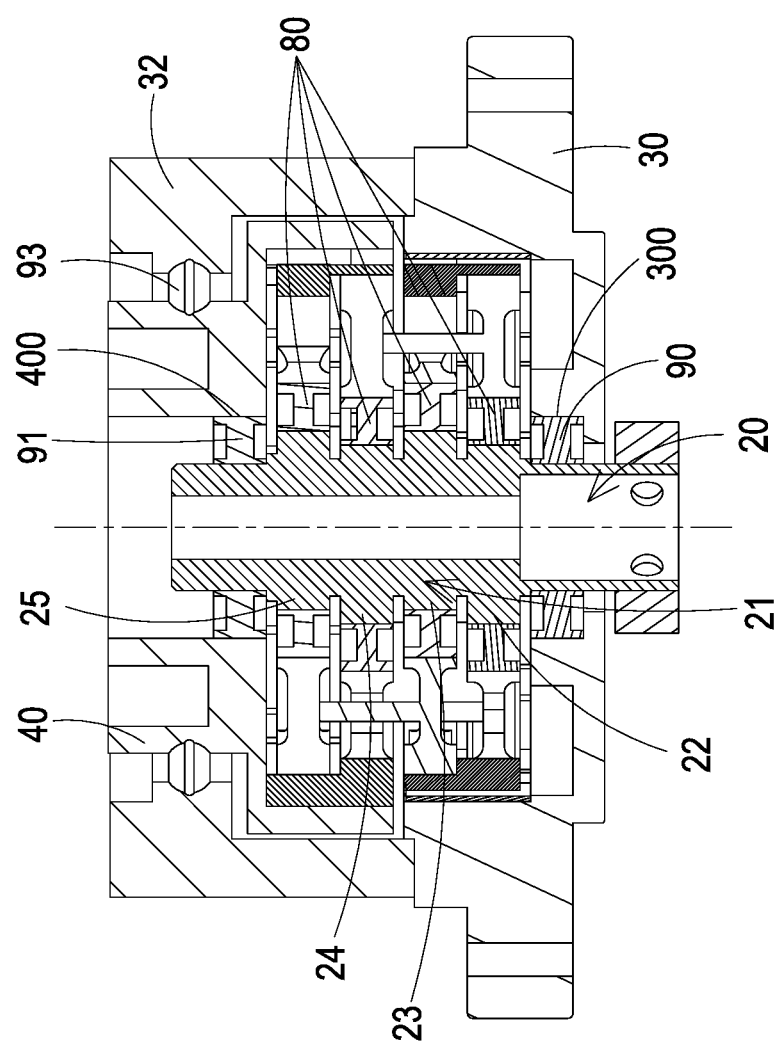
FIG. 4 is a schematic cross-sectional view illustrating the cycloid speed reducer of FIG. 1.

Please refer to FIGS. 1, 2, 3 and 4. FIG. 1 is a schematic assembled view illustrating a cycloid speed reducer according to a first embodiment of the present invention. FIG. 2 is a schematic exploded view illustrating the cycloid speed reducer of FIG. 1 and taken along a viewpoint. FIG. 3 is a schematic exploded view illustrating the cycloid speed reducer of FIG. 1 and taken along another viewpoint. FIG. 4 is a schematic cross-sectional view illustrating the cycloid speed reducer of FIG. 1. The cycloid speed reducer 1 can be applied to motors, machine tools, robotic arms, automobiles, motorcycles or other motive machines in order to provide a speed reducing function.

In this embodiment, the cycloid speed reducer 1 is a two-stage cycloid speed reducer. The cycloid speed reducer 1 comprises an eccentric device 2, a first roller assembly 3, a second roller assembly 4, a first rotating disc assembly 5 and a second rotating disc assembly 6.

The eccentric device 2 receives an input power from a motor (not shown). In response to the input power, the eccentric device 2 is driven to rotate. In an embodiment, the eccentric device 2 comprises a rotating shaft 20 and an eccentric assembly 21. In response to the input power from the motor, the rotating shaft 20 is rotated. The rotating shaft 20 has a first end 200 and a second end 201, which are opposed to each other. The eccentric assembly 21 is eccentrically fixed on the rotating shaft 20. That is, the rotating center of the eccentric assembly 21 is not the axle center of the rotating shaft 20. The eccentric assembly 21 is arranged between the first end 200 and the second end 201 of the rotating shaft 20. As the rotating shaft 20 is rotated, the eccentric assembly 21 is eccentrically rotated relative to the axle center of the rotating shaft 20.

The first roller assembly 3 comprises a first wheel disc 30 and plural first rollers 31. The first wheel disc 30 is a circular disc structure or a hollow cylindrical structure that is made of metallic material or alloy. Moreover, a first bearing 90 (see FIG. 4) is disposed within a center hole 300 of the first wheel disc 30. The central hole 300 is located at the geometric center of the first wheel disc 30. An example of the first bearing 90 includes but is not limited to a ball bearing, a needle bearing or an oil-retaining bearing. Through the first bearing 90, the rotating shaft 20 is partially accommodated within the center hole 300 of the first wheel disc 30. Consequently, the first end 200 and the second end 201 of the rotating shaft 20 are located at two opposite sides of the first wheel disc 30. Preferably but not exclusively, the plural first rollers 31 are circular posts, which are made of metallic material or alloy. Moreover, the plural first rollers 31 are circumferentially and discretely arranged on the first wheel disc 30 at regular intervals. In this embodiment, the first roller assembly 3 is not rotated about the axle center of the rotating shaft 20. That is, the first wheel disc 30 and the plural first rollers 31 are not rotated about the axle center of the rotating shaft 20. However, the plural first rollers 31 are rotatable about their own axles (i.e., self-rotation).

In some embodiments, the first roller assembly 3 further comprises a casing 32. The casing 32 is assembled with the first wheel disc 30 and has a hollow structure. After the eccentric device 2, the first roller assembly 3, the second roller assembly 4, the first rotating disc assembly 5 and the second rotating disc assembly 6 are combined together as the cycloid speed reducer 1 (see FIG. 1), a portion of the eccentric device 2, the second roller assembly 4, the first rotating disc assembly 5 and the second rotating disc assembly 6 are accommodated within the hollow structure of the casing 32. Alternatively, a portion of the eccentric device 2, the second roller assembly 4 and the second rotating disc assembly 6 are accommodated within the hollow structure of the casing 32, and the first rotating disc assembly 5 is accommodated within the first wheel disc 30 (see FIG. 4).

The second roller assembly 4 comprises a second wheel disc 40 and plural second rollers 41. The second wheel disc 40 is a circular disc structure or a hollow cylindrical structure that is made of metallic material or alloy. Moreover, a second bearing 91 (see FIG. 4) is disposed within a center hole 400 of the second wheel disc 40. The central hole 400 is located at the geometric center of the second wheel disc 40. An example of the second bearing 91 includes but is not limited to a ball bearing, a needle bearing or an oil-retaining bearing. Through the second bearing 91, the rotating shaft 20 is partially accommodated within the center hole 400 of the second wheel disc 40. Consequently, the first end 200 and the second end 201 of the rotating shaft 20 are located at two opposite sides of the second wheel disc 40. Preferably but not exclusively, the plural second rollers 41 are circular posts, which are made of metallic material or alloy. The plural second rollers 41 are circumferentially and discretely arranged on the second wheel disc 40 at regular intervals. In this embodiment, the second roller assembly 4 can be rotated about the axle center of the rotating shaft 20. That is, the second wheel disc 40 and the plural second rollers 41 can be rotated about the axle center of the rotating shaft 20. Moreover, the second wheel disc 40 is a power output component of the cycloid speed reducer 1 that generates the output power. In some embodiments, the plural second rollers 41 are rotatable about their own axles.

In an embodiment, the cycloid speed reducer 1 further comprises a third bearing 93 (see FIG. 4). The third bearing 93 is disposed within the hollow structure of the casing 32 and arranged between the casing 32 and the second wheel disc 40. Consequently, the second roller assembly 4 is rotatable within the casing 32.

The first rotating disc assembly 5 is installed on the eccentric assembly 21 and rotated with the eccentric assembly 21. The first rotating disc assembly 5 comprises a first cycloid disc 50 and a second cycloid disc 51. The first cycloid disc 50 is arranged beside the first wheel disc 30. Moreover, the first cycloid disc 50 comprises plural first connecting parts 52 and at least one first outer tooth 54. The at least one first outer tooth 54 is protruded from an outer periphery of the first cycloid disc 50. Moreover, the at least one first outer tooth 54 is contacted with the at least one first roller 31. The second cycloid disc 51 is arranged beside the first cycloid disc 50. Moreover, the second cycloid disc 51 and the first wheel disc 30 are located at two opposite sides of the first cycloid disc 50. The second cycloid disc 51 comprises at least one second outer tooth 55, plural second connecting parts 53 and plural first perforations 56. The at least one second outer tooth 55 is protruded from an outer periphery of the second cycloid disc 51. Moreover, the at least one second outer tooth 55 is contacted with the at least one first roller 31.

The second rotating disc assembly 6 is installed on the eccentric assembly 21 and rotated with the eccentric assembly 21. The second rotating disc assembly 6 comprises a third cycloid disc 60 and a fourth cycloid disc 61. The third cycloid disc 60 is arranged between the second cycloid disc 51 and the second wheel disc 40. The third cycloid disc 60 comprises plural second perforations 62 and at least one third outer tooth 63. The at least one third outer tooth 63 is protruded from an outer periphery of the third cycloid disc 60. Moreover, the at least one third outer tooth 63 is contacted with the at least one second roller 41. The fourth cycloid disc 61 is arranged between the third cycloid disc 60 and the second wheel disc 40. The fourth cycloid disc 61 comprises at least one fourth outer tooth 64. The at least one fourth outer tooth 64 is protruded from an outer periphery of the fourth cycloid disc 61. Moreover, the at least one fourth outer tooth 64 is contacted with the at least one second roller 41.

The first connecting parts 52 are arranged between the first cycloid disc 50 and the third cycloid disc 60 and penetrated through the corresponding first perforations 56. The first ends of the first connecting parts 52 are fixed on the first cycloid disc 50. The second ends of the first connecting parts 52 are assembled with the third cycloid disc 60. Consequently, the first cycloid disc 50 and the third cycloid disc 60 are connected with each other through the first connecting parts 52. The second connecting parts 53 are arranged between the second cycloid disc 51 and the fourth cycloid disc 61 and penetrated through the corresponding second perforations 62. The first ends of the second connecting parts 53 are fixed on the second cycloid disc 51. The second ends of the second connecting parts 53 are assembled with the fourth cycloid disc 61. Consequently, the second cycloid disc 51 and the fourth cycloid disc 61 are connected with each other through the second connecting parts 53.

Moreover, the first cycloid disc 50 comprises a first axle hole 57, and the second cycloid disc 51 comprises a second axle hole 58. The first axle hole 57 is located at the geometric center of the first cycloid disc 50. The second axle hole 58 is located at the geometric center of the second cycloid disc 51. A portion of the eccentric assembly 21 is rotatably installed within the first axle hole 57 and the second axle hole 58. When the eccentric device 2 is rotated, the first cycloid disc 50 and the second cycloid disc 51 are correspondingly rotated with the eccentric assembly 21 of the eccentric device 2. Since the first cycloid disc 50 and the third cycloid disc 60 are connected with each other through the first connecting parts 52, the first cycloid disc 50 and the third cycloid disc 60 are synchronously rotated in the same direction.

Moreover, the third cycloid disc 60 comprises a third axle hole 65, and the fourth cycloid disc 61 comprises a fourth axle hole 66. The third axle hole 65 is located at the geometric center of the third cycloid disc 60. The fourth axle hole 66 is located at the geometric center of the fourth cycloid disc 61. A portion of the eccentric assembly 21 is rotatably installed within the third axle hole 65 and the fourth axle hole 66. When the eccentric assembly 21 is rotated, the third cycloid disc 60 and the fourth cycloid disc 61 are correspondingly rotated with the eccentric assembly 21 of the eccentric device 2. Since the second cycloid disc 51 and the fourth cycloid disc 61 are connected with each other through the second connecting parts 53, the second cycloid disc 51 and the fourth cycloid disc 61 are synchronously rotated in the same direction.

From the above descriptions, the cycloid speed reducer 1 comprises two cycloid disc assemblies, i.e., the first rotating disc assembly 5 and the second rotating disc assembly 6. The first rotating disc assembly 5 comprises two cycloid discs, i.e., the first cycloid disc 50 and the second cycloid disc 51. The second rotating disc assembly 6 comprises two cycloid discs, i.e., the third cycloid disc 60 and the fourth cycloid disc 61. In other words, the cycloid speed reducer 1 have four cycloid discs to be contacted with the first rollers 31 of the first roller assembly 3 and the second rollers 41 of the second roller assembly 4. In comparison with the conventional cycloid speed reducer using two cycloid discs to be contacted with the rollers, the load withstood by each cycloid disc of the cycloid speed reducer 1 is reduced. Since the cycloid speed reducer 1 has stronger structural strength and higher rigidity, the cycloid speed reducer 1 can be applied to the high-load circumstance.

Figure 5:
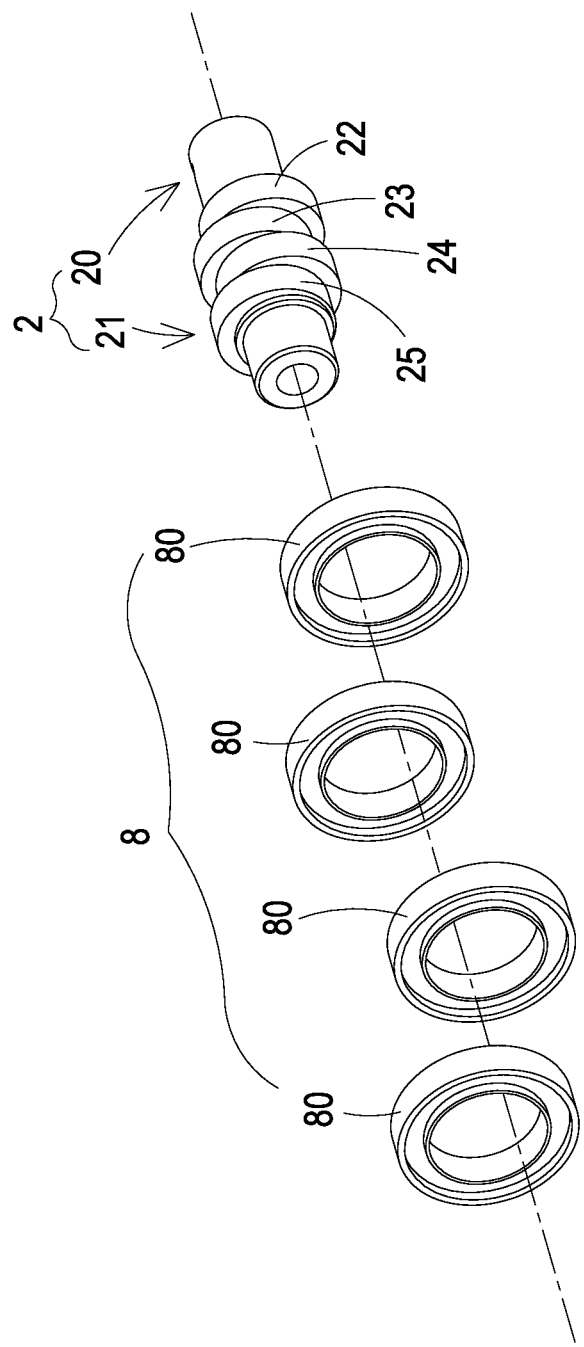
FIG. 5 is a schematic exploded view illustrating the relationships between the eccentric assembly and a bearing set in the cycloid speed reducer of FIG. 1.

FIG. 5 is a schematic exploded view illustrating the relationships between the eccentric assembly and a bearing set in the cycloid speed reducer of FIG. 1. Please refer to FIGS. 2, 4 and 5. The eccentric assembly 21 is rotatably installed within the first axle hole 57, the second axle hole 58, the third axle hole 65 and the fourth axle hole 66 through the bearing set 8. Preferably but not exclusively, the bearing set 8 comprises four independent fourth bearings 80. The eccentric assembly 21 comprises a first eccentric cylinder 22, a second eccentric cylinder 23, a third eccentric cylinder 24 and a fourth eccentric cylinder 25, which are eccentrically fixed on the rotating shaft 20 and arranged side by side.

The fourth bearings 80 are sheathed around the first eccentric cylinder 22, the second eccentric cylinder 23, the third eccentric cylinder 24 and the fourth eccentric cylinder 25, respectively. Consequently, the first eccentric cylinder 22 is installed within the first axle hole 57 of the first cycloid disc 50 through the corresponding fourth bearing 80. Similarly, the second eccentric cylinder 23 is installed within the second axle hole 58 of the second cycloid disc 51 through the corresponding fourth bearing 80. Similarly, the third eccentric cylinder 24 is installed within the third axle hole 65 of the third cycloid disc 60 through the corresponding fourth bearing 80. Similarly, the fourth eccentric cylinder 25 is installed within the fourth axle hole 66 of the fourth cycloid disc 61 through the corresponding fourth bearing 80. In other words, the first cycloid disc 50, the second cycloid disc 51, the third cycloid disc 60 and the fourth cycloid disc 61 are sheathed around the first eccentric cylinder 22, the second eccentric cylinder 23, the third eccentric cylinder 24 and the fourth eccentric cylinder 25, respectively. The eccentric direction of the first eccentric cylinder 22 and the eccentric direction of the third eccentric cylinder 24 are identical. The eccentric direction of the second eccentric cylinder 23 and the eccentric direction of the fourth eccentric cylinder 25 are identical. The eccentric directions of the first eccentric cylinder 22 and the third eccentric cylinder 24 are opposite to the eccentric directions of the second eccentric cylinder 23 and the fourth eccentric cylinder 25. In other words, the eccentric directions of the first cycloid disc 50 and the third cycloid disc 60 are opposite to the eccentric directions of the second cycloid disc 51 and the fourth cycloid disc 61. Consequently, it is not necessary to install an additional weight compensation device in the cycloid speed reducer 1 to compensate the dynamic equilibrium.

As mentioned above, the first outer teeth 54 of the first cycloid disc 50 and the second outer teeth 55 of the second cycloid disc 51 are contacted with the first rollers 31, and the third outer teeth 63 of the third cycloid disc 60 and the fourth outer teeth 64 of the fourth cycloid disc 61 are contacted with the second rollers 41. Consequently, the number of the first outer teeth 54 of the first cycloid disc 50 is equal to the number of the second outer teeth 55 of the second cycloid disc 51, and the number of the third outer teeth 63 of the third cycloid disc 60 is equal to the number of the fourth outer teeth 64 of the fourth cycloid disc 61. The tooth profile of the first outer teeth 54 of the first cycloid disc 50 matches the tooth profile of the second outer teeth 55 of the second cycloid disc 51, and the tooth profile of the third outer teeth 63 of the third cycloid disc 60 matches the tooth profile of the fourth outer teeth 64 of the fourth cycloid disc 61. Moreover, the number of the first rollers 31 is at least one more than the number of the first outer teeth 54 and at least one more than the number of the second outer teeth 55, and the number of the second rollers 41 is at least one more than the number of the third outer teeth 63 and at least one more than the number of the fourth outer teeth 64.

Preferably, the second connecting parts 53 are penetrated through the corresponding second perforations 62 and separated from the peripheries of the corresponding second perforations 62. Consequently, while the first cycloid disc 50 and the third cycloid disc 60 are synchronously rotated, the operations of the first cycloid disc 50 and the third cycloid disc 60 are not interfered by the second connecting parts 53. Similarly, the first connecting parts 52 are penetrated through the corresponding first perforations 56 and separated from the peripheries of the corresponding first perforations 56. Consequently, while the second cycloid disc 51 and the fourth cycloid disc 61 are synchronously rotated, the operations of the second cycloid disc 51 and the fourth cycloid disc 61 are not interfered by the first connecting parts 52.

In the embodiment as shown in FIG. 2, the first connecting parts 52 and the second connecting parts 53 are trapezoidal prisms. Correspondingly, the first perforations 56 and the second perforations 62 have trapezoidal profiles. It is noted that the profiles of the first connecting parts 52, the second connecting parts 53, the first perforations 56 and the second perforations 62 are not restricted and may be varied according to the practical requirements. For example, in another embodiment, the first connecting parts 52 and the second connecting parts 53 are cylindrical posts. Correspondingly, the first perforations 56 and the second perforations 62 have circular profiles.

In an embodiment, the first eccentric cylinder 22, the second eccentric cylinder 23, the third eccentric cylinder 24 and the fourth eccentric cylinder 25 of the eccentric assembly 21 are integrally formed with the rotating shaft 20. For sheathing the corresponding fourth bearings 80 around the first eccentric cylinder 22, the second eccentric cylinder 23, the third eccentric cylinder 24 and the fourth eccentric cylinder 25, the radiuses of the first eccentric cylinder 22, the second eccentric cylinder 23, the third eccentric cylinder 24 and the fourth eccentric cylinder 25 are specifically designed. For example, the radius R2 of the second eccentric cylinder 23 is larger than the radius R1 of the first eccentric cylinder 22, and the radius R3 of the third eccentric cylinder 24 is larger than the radius R4 of the fourth eccentric cylinder 25.

In some other embodiments, the eccentric cylinders of the eccentric assembly 21 are not integrally formed with the rotating shaft 20. For sheathing the fourth bearings 80 around the corresponding eccentric cylinders, at least two eccentric cylinders of the first eccentric cylinder 22, the second eccentric cylinder 23, the third eccentric cylinder 24 and the fourth eccentric cylinder 25 are assembled with the rotating shaft 20 and the other eccentric cylinders are integrally formed with the rotating shaft 20.

Figure 6:
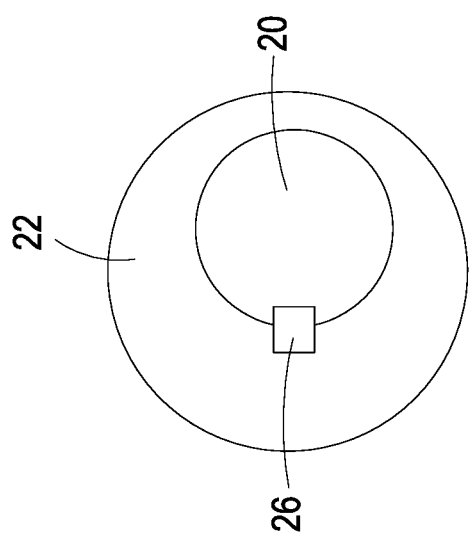
FIG. 6 is a schematic cross-sectional view illustrating a way of assembling one eccentric cylinder with the rotating shaft as shown in FIG. 4.

FIG. 6 is a schematic cross-sectional view illustrating a way of assembling one eccentric cylinder with the rotating shaft as shown in FIG. 4. In the embodiment of FIG. 6, the eccentric cylinder (e.g., the first eccentric cylinder 22) is assembled with the rotating shaft 20. For smoothly transmitting the rotating force of the rotating shaft 20 to each eccentric cylinder on the rotating shaft 20, the eccentric device further comprises a coupling pin 26. The eccentric cylinder is fixed on the rotating shaft 20 through the coupling pin 26, so that the eccentric cylinder can be tightly fitted on the rotating shaft 20.

The principles of achieving the desired reduction ratio by using the cycloid speed reducer 1 will be described as follows. Please refer FIGS. 1 to 5 again. For example, the number of the first rollers 31 of the first roller assembly 3 is N, and the number of the second rollers 41 of the second roller assembly 4 is M. Moreover, it is assumed that the number of the first rollers 31 is one more than the number of the first outer teeth 54 and one more than the number of the second outer teeth 55. Similarly, it is assumed that the number of the second rollers 41 is one more than the number of the third outer teeth 63 and one more than the number of the fourth outer teeth 64. That is, the number of the first outer teeth 54 is $(N-1)$, the number of the second outer teeth 55 is $(N-1)$, the number of the third outer teeth 63 is $(M-1)$, and the number of the fourth outer teeth 64 is $(M-1)$. Consequently, the reduction ratio R of the cycloid speed reducer 1 is equal to $(N-1) \times M/(N-M)$. For achieving the speed reduction purpose, N and M are not equal. For increasing the dynamic equilibrium efficacy, N and M are even numbers, wherein N≥2 and M≥2. In case that N>M and the reduction ratio R is positive, the rotating direction of the second wheel disc 40 (i.e., the power output component) and the rotating direction of the rotating shaft 20 are identical. Whereas, in case that N<M and the reduction ratio R is negative, the rotating direction of the second wheel disc 40 (i.e., the power output component) and the rotating direction of the rotating shaft 20 are opposite.

Figure 7:
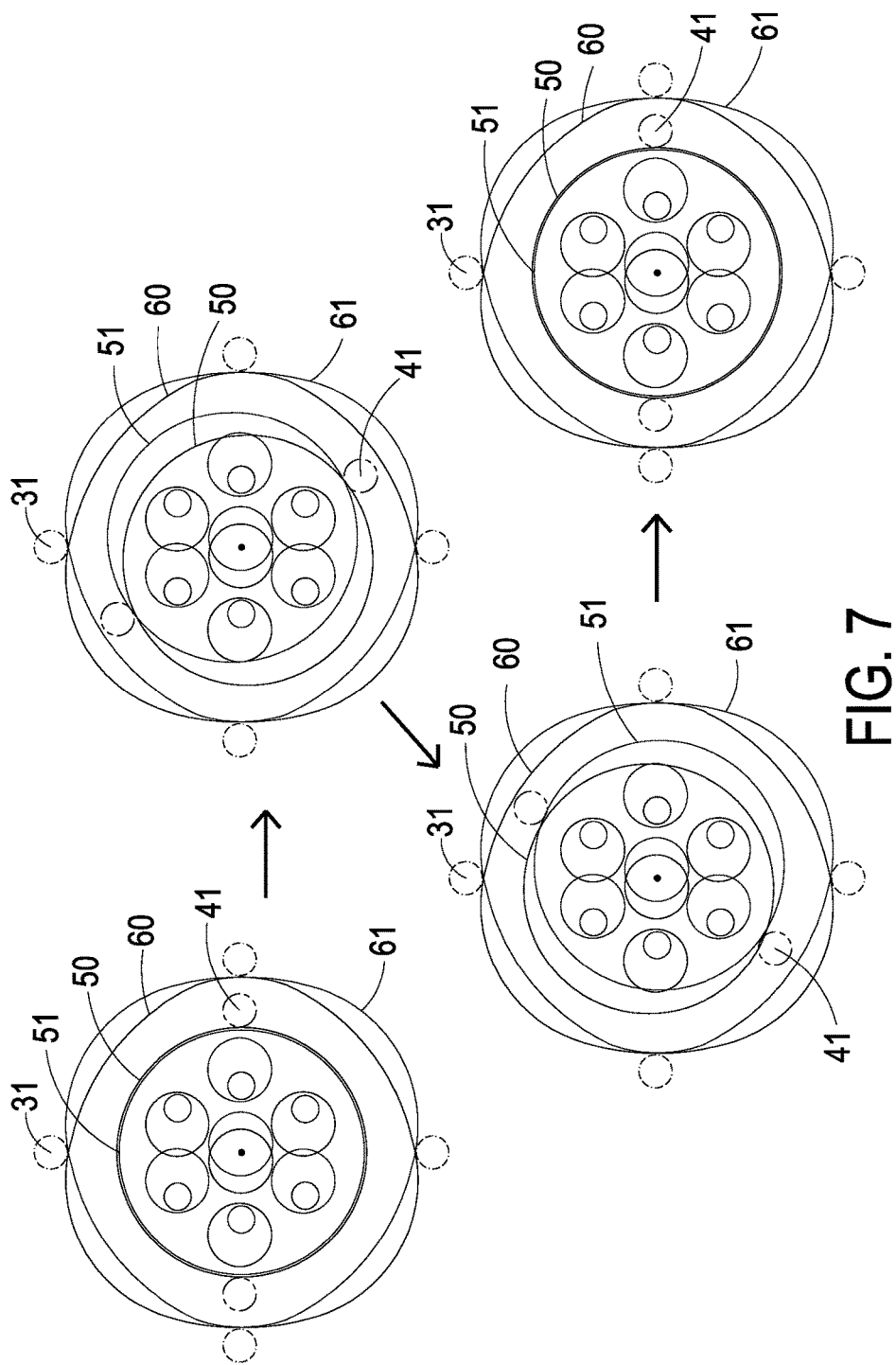
FIG. 7 schematically illustrates the sequential actions of the cycloid speed reducer according to the first embodiment of the present invention.

Hereinafter, the operations of the cycloid speed reducer 1 will be illustrated with reference to FIG. 7. FIG. 7 schematically illustrates the sequential actions of the cycloid speed reducer according to the first embodiment of the present invention. For example, the number N of the first rollers 31 is 4, and the number M of the second rollers 41 is 2. Consequently, the reduction ratio R of the cycloid speed reducer 1 is equal to (4−1)×2/(4−2)=3. In FIG. 7, the time interval between every two adjacent actions is equal to the time period of rotating one turn of the rotating shaft 20. Please refer FIG. 7 and also FIGS. 1 to 5. As shown in FIG. 7, the rotating shaft 20 receives the input power from the motor (not shown), and the rotating shaft 20 is rotated in the counterclockwise direction. As the rotating shaft 20 is rotated, the first eccentric cylinder 22, the second eccentric cylinder 23, the third eccentric cylinder 24 and the fourth eccentric cylinder 25 are eccentrically rotated. While the first eccentric cylinder 22, the second eccentric cylinder 23, the third eccentric cylinder 24 and the fourth eccentric cylinder 25 are eccentrically rotated, pushing forces are generated to push the first cycloid disc 50, the second cycloid disc 51, the third cycloid disc 60 and the fourth cycloid disc 61 to slowly rotate in the clockwise direction. Moreover, since the first rollers 31 are not rotated about the axle center of the rotating shaft 20, the third outer teeth 63 of the third cycloid disc 60 and the fourth outer teeth 64 of the fourth cycloid disc 61 are pushed against the second rollers 41 of the second roller assembly 4. Under this circumstance, the second rollers 41 are rotated about the axle center of the rotating shaft 20 in the counterclockwise direction. Consequently, the motions of the second rollers 41 result in the counterclockwise rotation of the second wheel disc 40. In other words, the second roller assembly 4 is also rotated in the counterclockwise direction. In this embodiment, the second wheel disc 40 of the second roller assembly 4 is a power output component of the cycloid speed reducer 1 that generates the output power.

Figure 8:
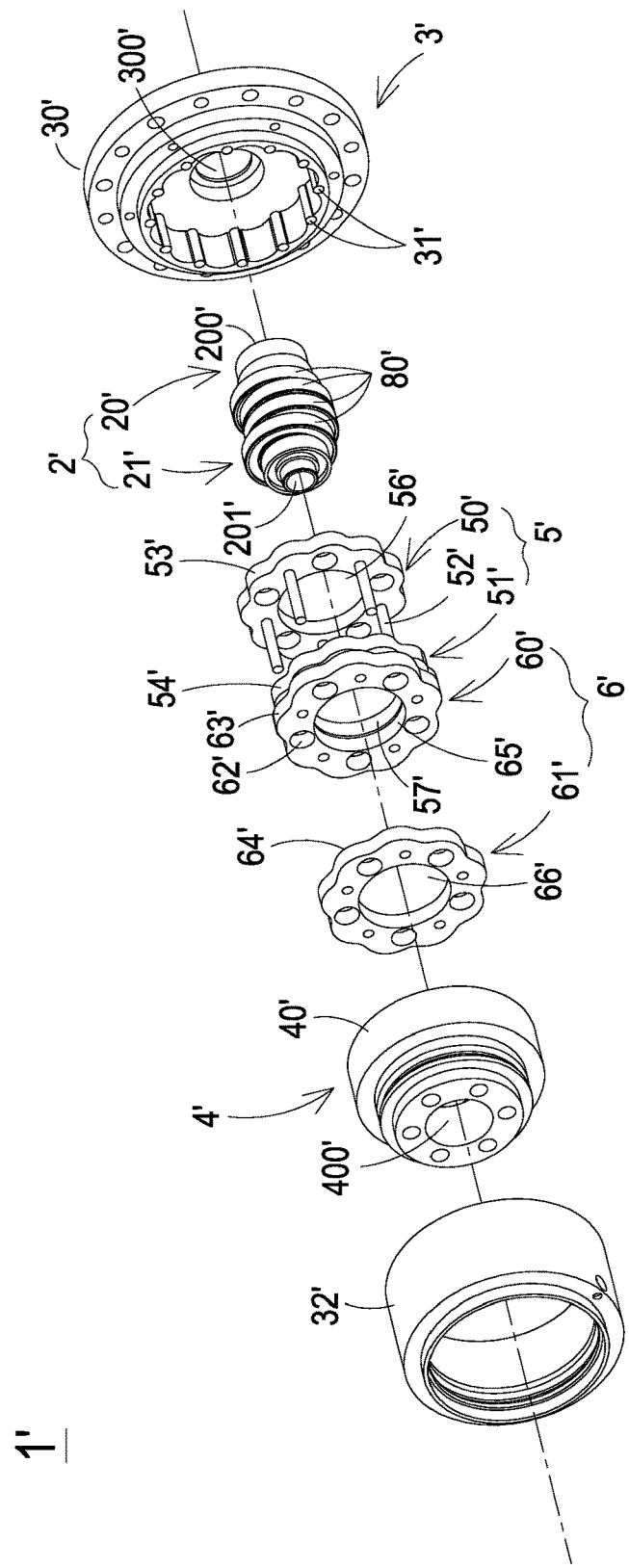
FIG. 8 is a schematic exploded view illustrating a cycloid speed reducer according to a second embodiment of the present invention and taken along a viewpoint.
Figure 9:
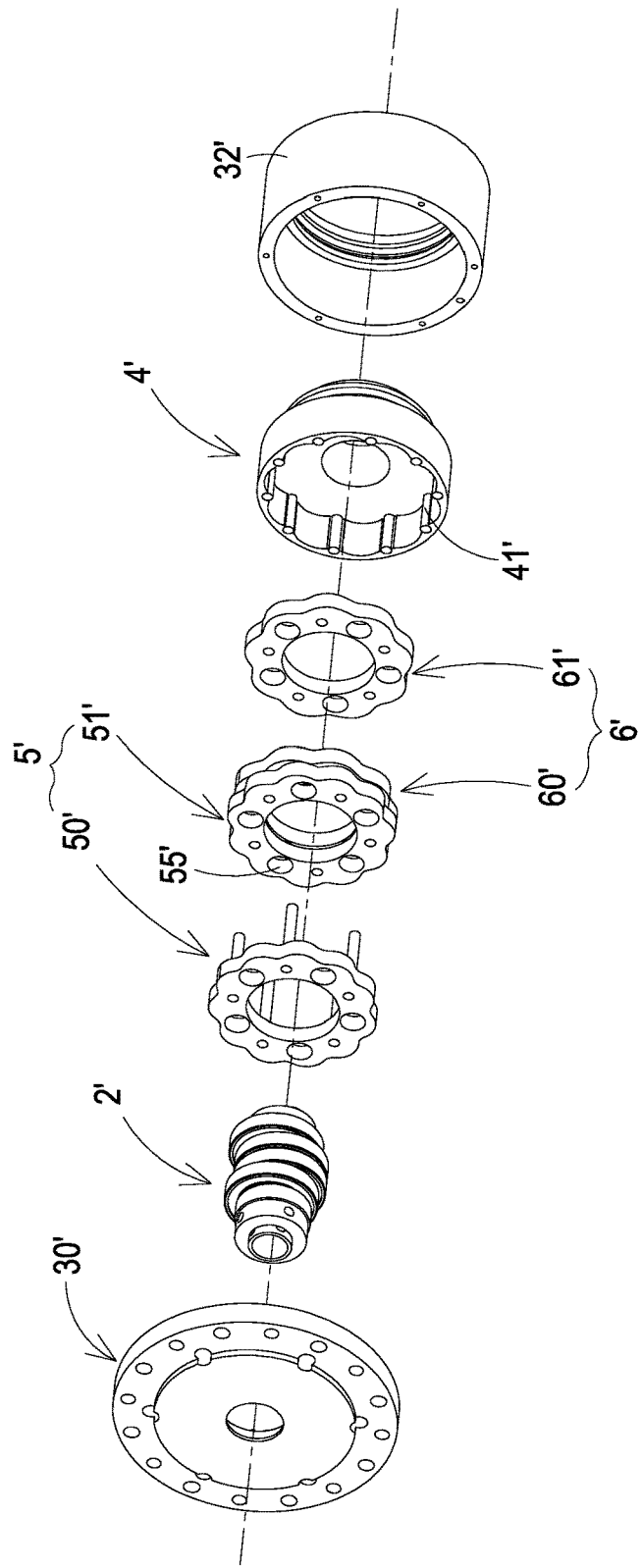
FIG. 9 is a schematic exploded view illustrating the cycloid speed reducer of FIG. 8 and taken along another viewpoint.
Figure 10:
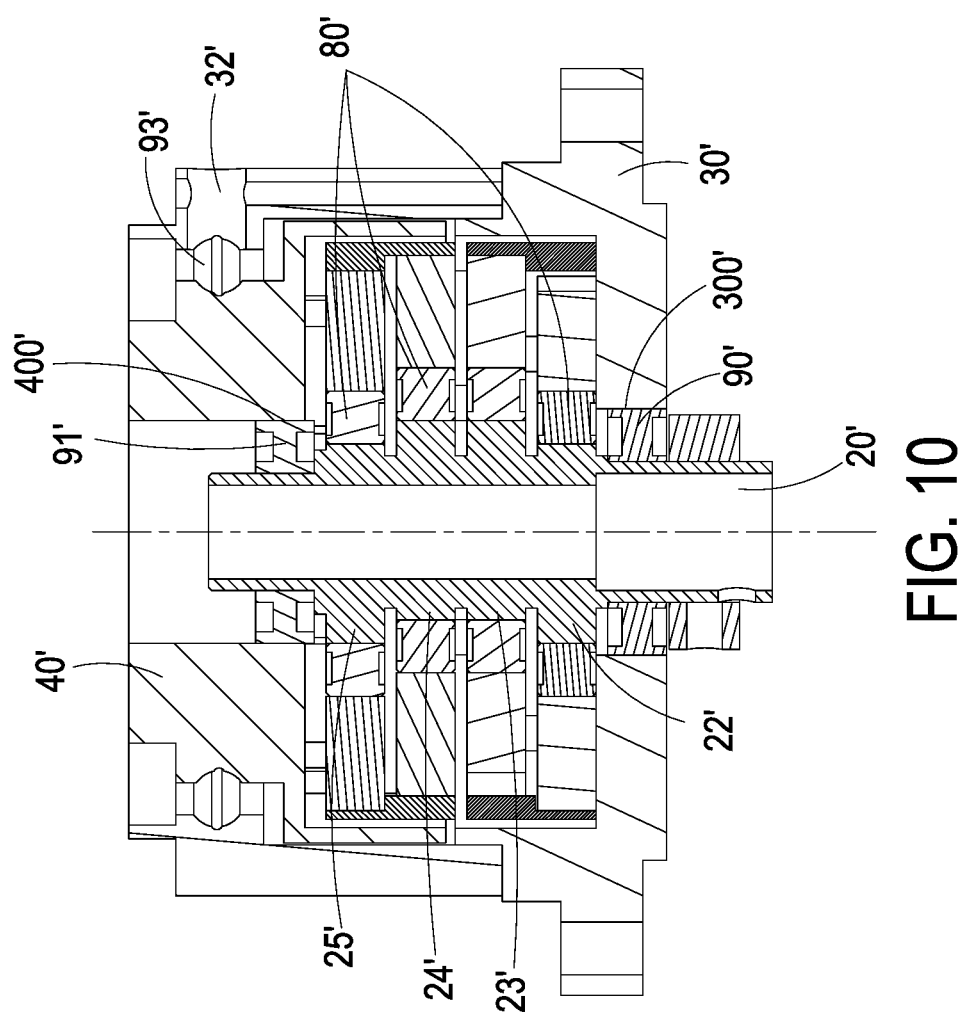
FIG. 10 is a schematic cross-sectional view illustrating the cycloid speed reducer of FIG. 8.

Please refer to FIGS. 8, 9 and 10. FIG. 8 is a schematic exploded view illustrating a cycloid speed reducer according to a second embodiment of the present invention and taken along a viewpoint. FIG. 9 is a schematic exploded view illustrating the cycloid speed reducer of FIG. 8 and taken along another viewpoint. FIG. 10 is a schematic cross-sectional view illustrating the cycloid speed reducer of FIG. 8. The cycloid speed reducer 1' can be applied to motors, machine tools, robotic arms, automobiles, motorcycles or other motive machines in order to provide a speed reducing function.

In this embodiment, the cycloid speed reducer 1' is a two-stage cycloid speed reducer. The cycloid speed reducer 1' comprises an eccentric device 2', a first roller assembly 3', a second roller assembly 4', a first rotating disc assembly 5' and a second rotating disc assembly 6'.

The eccentric device 2' receives an input power from a motor (not shown). In response to the input power, the eccentric device 2' is driven to rotate. In an embodiment, the eccentric device 2' comprises a rotating shaft 20' and an eccentric assembly 21'. In response to the input power from the motor, the rotating shaft 20' is rotated. The rotating shaft 20' has a first end 200' and a second end 201', which are opposed to each other. The eccentric assembly 21' is eccentrically fixed on the rotating shaft 20'. The eccentric assembly 21' is arranged between the first end 200' and the second end 201' of the rotating shaft 20'. As the rotating shaft 20' is rotated, the eccentric assembly 21' is eccentrically rotated relative to the axle center of the rotating shaft 20'.

The first roller assembly 3' comprises a first wheel disc 30' and plural first rollers 31'. The first wheel disc 30' is a circular disc structure or a hollow cylindrical structure that is made of metallic material or alloy. Moreover, a first bearing 90' is disposed within a center hole 300' of the first wheel disc 30'. The central hole 300' is located at the geometric center of the first wheel disc 30'. An example of the first bearing 90' includes but is not limited to a ball bearing, a needle bearing or an oil-retaining bearing. Through the first bearing 90', the rotating shaft 20' is partially accommodated within the center hole 300' of the first wheel disc 30'. Consequently, the first end 200' and the second end 201' of the rotating shaft 20' are located at two opposite sides of the first wheel disc 30'. Preferably but not exclusively, the plural first rollers 31' are circular posts, which are made of metallic material or alloy. Moreover, the plural first rollers 31' are circumferentially and discretely arranged on the first wheel disc 30' at regular intervals.

In some embodiments, the first roller assembly 3' further comprises a casing 32'. The casing 32' is assembled with the first wheel disc 30' and has a hollow structure. After the eccentric device 2', the first roller assembly 3', the second roller assembly 4', the first rotating disc assembly 5' and the second rotating disc assembly 6' are combined together as the cycloid speed reducer 1', a portion of the eccentric device 2', the second roller assembly 4', the first rotating disc assembly 5' and the second rotating disc assembly 6' are accommodated within the hollow structure of the casing 32'. In this embodiment, the first roller assembly 3' is not rotated about the axle center of the rotating shaft 20'. That is, the first wheel disc 30', the plural first rollers 31' and the casing 32' are not rotated about the axle center of the rotating shaft 20'. However, the plural first rollers 31' are rotatable about their own axles (i.e., self-rotation).

The second roller assembly 4' comprises a second wheel disc 40' and plural second rollers 41'. The second wheel disc 40' is a circular disc structure or a hollow cylindrical structure that is made of metallic material or alloy. Moreover, a second bearing 91' is disposed within a center hole 400' of the second wheel disc 40'. The central hole 400' is located at the geometric center of the second wheel disc 40'. An example of the second bearing 91' includes but is not limited to a ball bearing, a needle bearing or an oil-retaining bearing. Through the second bearing 91', the rotating shaft 20' is partially accommodated within the center hole 400' of the second wheel disc 40'. Consequently, the first end 200' and the second end 201' of the rotating shaft 20' are located at two opposite sides of the second wheel disc 40'. Preferably but not exclusively, the plural second rollers 41' are circular posts, which are made of metallic material or alloy. The plural second rollers 41' are circumferentially and discretely arranged on the second wheel disc 40' at regular intervals. In this embodiment, the second roller assembly 4' can be rotated about the axle center of the rotating shaft 20'. That is, the second wheel disc 40' and the plural second rollers 41' can be rotated about the axle center of the rotating shaft 20'. Moreover, the second wheel disc 40' is a power output component of the cycloid speed reducer 1 that generates the output power. In some embodiments, the plural second rollers 41' are rotatable about their own axles.

In an embodiment, the cycloid speed reducer 1' further comprises a third bearing 93'. The third bearing 93' is disposed within the hollow structure of the casing 32' and arranged between the casing 32' and the second wheel disc 40'. Consequently, the second roller assembly 4' is rotatable within the casing 32'.

The first rotating disc assembly 5' is installed on the eccentric assembly 21' and rotated with the eccentric assembly 21'. The first rotating disc assembly 5' comprises a first cycloid disc 50' and a second cycloid disc 51'. The first cycloid disc 50' is arranged beside the first wheel disc 30'. Moreover, the first cycloid disc 50' comprises plural connecting parts 52' and at least one first outer tooth 53'. The at least one first outer tooth 53' is protruded from an outer periphery of the first cycloid disc 50'. Moreover, the at least one first outer tooth 53' is contacted with the at least one first roller 31'. The second cycloid disc 51' is arranged beside the first cycloid disc 50'. Moreover, the second cycloid disc 51' and the first wheel disc 30' are located at two opposite sides of the first cycloid disc 50'. The second cycloid disc 51' comprises at least one second outer tooth 54' and plural first perforations 55'. The at least one second outer tooth 54' is protruded from an outer periphery of the second cycloid disc 51'. Moreover, the at least one second outer tooth 54' is contacted with the at least one first roller 31'.

The second rotating disc assembly 6' is installed on the eccentric assembly 21' and rotated with the eccentric assembly 21'. The second rotating disc assembly 6' comprises a third cycloid disc 60' and a fourth cycloid disc 61'. The third cycloid disc 60' is arranged between the second cycloid disc 51' and the second wheel disc 40' and fixed on the second cycloid disc 51'. The third cycloid disc 60 comprises plural second perforations 62' and at least one third outer tooth 63'. The at least one third outer tooth 63' is protruded from an outer periphery of the third cycloid disc 60'. Moreover, the at least one third outer tooth 63' is contacted with the at least one second roller 41'. The fourth cycloid disc 61' is arranged between the third cycloid disc 60' and the second wheel disc 40'. The fourth cycloid disc 61' comprises at least one fourth outer tooth 64'. The at least one fourth outer tooth 64' is protruded from an outer periphery of the fourth cycloid disc 61'. Moreover, the at least one fourth outer tooth 64' is contacted with the at least one second roller 41'. The plural second perforations 62' are aligned with the corresponding first perforations 55'.

The connecting parts 52' are penetrated through the corresponding first perforations 55' and the corresponding second perforations 62'. Moreover, the connecting parts 52' are arranged between the first cycloid disc 50' and the fourth cycloid disc 61'. The first ends of the connecting parts 52' are fixed on the first cycloid disc 50'. The second ends of the connecting parts 52' are assembled with the fourth cycloid disc 61'. Consequently, the first cycloid disc 50' and the fourth cycloid disc 61' are connected with each other through the connecting parts 52'. Moreover, the first cycloid disc 50' comprises a first axle hole 56', and the second cycloid disc 51' comprises a second axle hole 57'. The first axle hole 56' is located at the geometric center of the first cycloid disc 50'. The second axle hole 57' is located at the geometric center of the second cycloid disc 51'. A portion of the eccentric assembly 21' is rotatably installed within the first axle hole 56' and the second axle hole 57'. When the eccentric device 2' is rotated, the first cycloid disc 50' and the second cycloid disc 51' are correspondingly rotated with the eccentric assembly 21' of the eccentric device 2'.

Moreover, the third cycloid disc 60' comprises a third axle hole 65', and the fourth cycloid disc 61' comprises a fourth axle hole 66'. The third axle hole 65' is located at the geometric center of the third cycloid disc 60'. The fourth axle hole 66' is located at the geometric center of the fourth cycloid disc 61'. A portion of the eccentric assembly 21' is rotatably installed within the third axle hole 65' and the fourth axle hole 66'. When the eccentric assembly 21' is rotated, the third cycloid disc 60' and the fourth cycloid disc 61' are correspondingly rotated with the eccentric assembly 21'.

Since the first cycloid disc 50' and the fourth cycloid disc 61' are connected with each other through the connecting parts 52', the first cycloid disc 50' and the fourth cycloid disc 61' are synchronously rotated in the same direction. Moreover, since the second cycloid disc 51' and the third cycloid disc 60' are fixed on each other, the second cycloid disc 51' and the third cycloid disc 60' are synchronously rotated in the same direction.

From the above descriptions, the cycloid speed reducer 1' comprises two cycloid disc assemblies, i.e., the first rotating disc assembly 5' and the second rotating disc assembly 6'. The first rotating disc assembly 5' comprises two cycloid discs, i.e., the first cycloid disc 50' and the second cycloid disc 51'. The second rotating disc assembly 6' comprises two cycloid discs, i.e., the third cycloid disc 60' and the fourth cycloid disc 61'. In other words, the cycloid speed reducer 1' have four cycloid discs to be contacted with the first rollers 31' of the first roller assembly 3' and the second rollers 41' of the second roller assembly 4'. In comparison with the conventional cycloid speed reducer using two cycloid discs to be contacted with the rollers, the load withstood by each cycloid disc of the cycloid speed reducer 1' is reduced. Since the cycloid speed reducer 1' has stronger structural strength and higher rigidity, the cycloid speed reducer 1' can be applied to the high-load circumstance.

Figure 11:
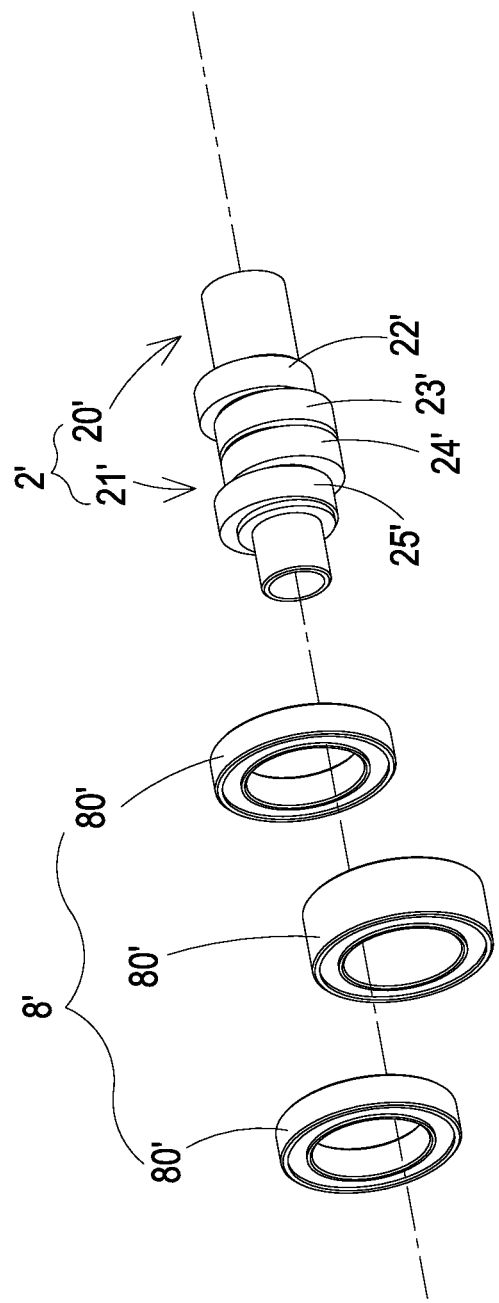
FIG. 11 is a schematic exploded view illustrating the relationships between the eccentric assembly and a bearing set in the cycloid speed reducer of FIG. 8.

FIG. 11 is a schematic exploded view illustrating the relationships between the eccentric assembly and a bearing set in the cycloid speed reducer of FIG. 8. Please refer to FIGS. 8, 10 and 11. The eccentric assembly 21' comprises a first eccentric cylinder 22', a second eccentric cylinder 23', a third eccentric cylinder 24' and a fourth eccentric cylinder 25', which are eccentrically fixed on the rotating shaft 20' and arranged side by side. The eccentric direction of the first eccentric cylinder 22' and the eccentric direction of the fourth eccentric cylinder 25' are identical. The eccentric direction of the second eccentric cylinder 23' and the eccentric direction of the third eccentric cylinder 24' are identical. The eccentric directions of the first eccentric cylinder 22' and the fourth eccentric cylinder 25' are opposite to the eccentric directions of the second eccentric cylinder 23' and the third eccentric cylinder 24'.

The eccentric assembly 21' is rotatably installed within the first axle hole 56', the second axle hole 57', the third axle hole 65' and the fourth axle hole 66' through the bearing set 8'. Preferably but not exclusively, the bearing set 8' comprises at least three independent fourth bearings 80'. The first eccentric cylinder 22' is installed within the first axle hole 56' of the first cycloid disc 50' through the corresponding fourth bearing 80'. Since the second eccentric cylinder 23' and the third eccentric cylinder 24' are arranged beside each other and their eccentric direction are identical, a single fourth bearing 80' may be accommodated within the second axle hole 57' of the second cycloid disc 51' and the third axle hole 65' of the third cycloid disc 60'. That is, the second eccentric cylinder 23' is installed within the second axle hole 57' of the second cycloid disc 51' and the third eccentric cylinder 24' is installed within the third axle hole 65' of the third cycloid disc 60' through the same fourth bearing 80'. The fourth eccentric cylinder 25' is installed within the fourth axle hole 66' of the fourth cycloid disc 61' through the corresponding fourth bearing 80'. In other words, the eccentric directions of the first cycloid disc 50' and the fourth cycloid disc 61' are opposite to the eccentric directions of the second cycloid disc 51' and the third cycloid disc 60'. Consequently, it is not necessary to install an additional weight compensation device in the cycloid speed reducer 1' to compensate the dynamic equilibrium. Alternatively, in another embodiment, two fourth bearings 80' are respectively accommodated within the second axle hole 57' of the second cycloid disc 51' and the third axle hole 65' of the third cycloid disc 60'. That is, the second eccentric cylinder 23' and the third eccentric cylinder 24' are installed within the second axle hole 57' of the second cycloid disc 51' and the third axle hole 65' of the third cycloid disc 60' through two independent fourth bearings 80'. Under this circumstance, the bearing set 8' comprises four independent fourth bearings 80'.

As mentioned above, the first outer teeth 53' of the first cycloid disc 50' and the second outer teeth 54' of the second cycloid disc 51' are contacted with the first rollers 31', and the third outer teeth 63' of the third cycloid disc 60' and the fourth outer teeth 64' of the fourth cycloid disc 61' are contacted with the second rollers 41'. Consequently, the number of the first outer teeth 53' of the first cycloid disc 50' is equal to the number of the second outer teeth 54' of the second cycloid disc 51', and the number of the third outer teeth 63' of the third cycloid disc 60' is equal to the number of the fourth outer teeth 64' of the fourth cycloid disc 61'. The tooth profile of the first outer teeth 53' of the first cycloid disc 50' matches the tooth profile of the second outer teeth 54' of the second cycloid disc 51', and the tooth profile of the third outer teeth 63' of the third cycloid disc 60' matches the tooth profile of the fourth outer teeth 64' of the fourth cycloid disc 61'. Moreover, the number of the first rollers 31' is at least one more than the number of the first outer teeth 53' and at least one more than the number of the second outer teeth 54', and the number of the second rollers 41' is at least one more than the number of the third outer teeth 63' and at least one more than the number of the fourth outer teeth 64'. Preferably, the connecting parts 52' are penetrated through the corresponding first perforations 55' and the corresponding second perforations 62' and separated from the peripheries of the corresponding first perforations 55' and the peripheries of the corresponding second perforations 62'. Consequently, while the second cycloid disc 51' and the third cycloid disc 60' are synchronously rotated, the operations of the second cycloid disc 51' and the third cycloid disc 60' are not interfered by the connecting parts 52'.

In the embodiment as shown in FIG. 8, the connecting parts 52' are circular posts. Correspondingly, the first perforations 55' and the second perforations 62' have circular profiles. It is noted that the profiles of the connecting parts 52', the first perforations 55' and the second perforations 62' are not restricted and may be varied according to the practical requirements. For example, in another embodiment, the connecting parts 52' are trapezoidal prisms. Correspondingly, the first perforations 55' and the second perforations 62' have trapezoidal profiles.

In an embodiment, the first eccentric cylinder 22', the second eccentric cylinder 23', the third eccentric cylinder 24' and the fourth eccentric cylinder 25' of the eccentric assembly 21' are integrally formed with the rotating shaft 20'. For sheathing the corresponding bearings 80' around the first eccentric cylinder 22', the second eccentric cylinder 23', the third eccentric cylinder 24' and the fourth eccentric cylinder 25', the radiuses of the first eccentric cylinder 22', the second eccentric cylinder 23', the third eccentric cylinder 24' and the fourth eccentric cylinder 25' are specifically designed. For example, the radius R2' of the second eccentric cylinder 23' is larger than the radius R1' of the first eccentric cylinder 22', and the radius R3' of the third eccentric cylinder 24' is larger than the radius R4' of the fourth eccentric cylinder 25'.

In some embodiments, the eccentric cylinders of the eccentric assembly 21' are not integrally formed with the rotating shaft 20'. For sheathing the bearings 80' around the corresponding eccentric cylinders, at least two eccentric cylinders of the first eccentric cylinder 22', the second eccentric cylinder 23', the third eccentric cylinder 24' and the fourth eccentric cylinder 25' are assembled with the rotating shaft 20' and the other eccentric cylinders are integrally formed with the rotating shaft 20'. For smoothly transmitting the rotating force of the rotating shaft 20' to each eccentric cylinder on the rotating shaft 20', the eccentric device further comprises a coupling pin (see also FIG. 6). The eccentric cylinder is fixed on the rotating shaft 20' through the coupling pin, so that the eccentric cylinder can be tightly fitted on the rotating shaft 20'.

The reduction ratio and the operating principles of the cycloid speed reducer 1' of FIG. 8 are similar to those of the cycloid speed reducer 1 of FIG. 1, and are not redundantly described herein.

From the above descriptions, the present invention provides a cycloid speed reducer. The cycloid speed reducer comprises two cycloid disc assemblies. Each rotating disc assembly comprises two cycloid discs. In other words, the cycloid speed reducer has four cycloid discs to be contacted with the corresponding rollers. In comparison with the conventional cycloid speed reducer using two cycloid discs, the load withstood by each cycloid disc of the cycloid speed reducer of the present invention is reduced. Since the cycloid speed reducer has stronger structural strength and higher rigidity, the cycloid speed reducer can be applied to the high-load circumstance. Moreover, the eccentric assembly of the eccentric device comprises plural eccentric cylinders. The eccentric cylinders are installed within the axle holes of the corresponding cycloid discs. Due to the plural eccentric cylinders, the eccentric direction of two cycloid discs is opposite to the eccentric direction of the other two cycloid discs. Consequently, it is not necessary to install an additional weight compensation device in the cycloid speed reducer to compensate the dynamic equilibrium.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cycloid speed reducer, comprising:
an eccentric device comprising a rotating shaft and an eccentric assembly, wherein the eccentric assembly is eccentrically fixed on the rotating shaft and arranged between a first end and a second end of the rotating shaft, wherein as the rotating shaft is rotated, the eccentric assembly is eccentrically rotated relative to an axle center of the rotating shaft;

a first roller assembly comprising a first wheel disc and plural first rollers, wherein the plural first rollers are disposed on the first wheel disc;

a second roller assembly comprising a second wheel disc and plural second rollers, wherein the plural second rollers are disposed on the second wheel disc;

a first rotating disc assembly installed on the eccentric assembly and rotated with the eccentric assembly, and comprising a first cycloid disc and a second cycloid disc, wherein the first cycloid disc is arranged beside the first wheel disc, the first cycloid disc comprises at least one first outer tooth, and the at least one first outer tooth is contacted with the at least one corresponding first roller, wherein the second cycloid disc is arranged beside the first cycloid disc, the second cycloid disc and the first wheel disc are located at two opposite sides of the first cycloid disc, the second cycloid disc comprises at least one second outer tooth, and the at least one second outer tooth is contacted with the at least one corresponding first roller; and a second rotating disc assembly installed on the eccentric assembly and rotated with the eccentric assembly, and comprising a third cycloid disc and a fourth cycloid disc, wherein the third cycloid disc is arranged between the second cycloid disc and the second wheel disc, the third cycloid disc comprises at least one third outer tooth, and the at least one third outer tooth is contacted with the at least one corresponding second roller, wherein the fourth cycloid disc is arranged between the third cycloid disc and the second wheel disc, the fourth cycloid disc comprises at least one fourth outer tooth, and the at least one fourth outer tooth is contacted with the at least one corresponding second roller.

2. The cycloid speed reducer according to claim 1, wherein the rotating shaft receives an input power, the rotating shaft and the eccentric assembly are synchronously rotated in response to the input power, and the first roller assembly is not rotated about the axle center of the rotating shaft, wherein the at least one third outer tooth and the at least one fourth outer teeth are pushed against the second rollers such that the second roller assembly is rotated, and the second wheel disc of the second roller assembly is rotated and generates an output power.

3. The cycloid speed reducer according to claim 1, wherein the first roller assembly further comprises a casing, and the casing is assembled with the first wheel disc and has a hollow structure, wherein a portion of the eccentric device, the second roller assembly and the second rotating disc assembly are accommodated within the hollow structure of the casing, and the first rotating disc assembly is accommodated within the first wheel disc or the hollow structure of the casing.

4. The cycloid speed reducer according to claim 1, wherein the first cycloid disc further comprises plural first connecting parts, the second cycloid disc further comprises plural second connecting parts and plural first perforations, and the third cycloid disc further comprises plural second perforations, wherein the first connecting parts are penetrated through the corresponding first perforations, so that the first cycloid disc and the third cycloid disc are connected with each other, wherein the second connecting parts are penetrated through the corresponding second perforations, so that the second cycloid disc and the fourth cycloid disc are connected with each other.

5. The cycloid speed reducer according to claim 4, wherein the second connecting parts are separated from peripheries of the corresponding second perforations, and the first connecting parts are separated from peripheries of the corresponding first perforations, wherein the first connecting parts and the second connecting parts are trapezoidal prisms, and the first perforations and the second perforations have trapezoidal profiles, or the first connecting parts and the second connecting parts are cylindrical posts, and the first perforations and the second perforations have circular profiles.

6. The cycloid speed reducer according to claim 4, wherein the eccentric assembly comprises a first eccentric cylinder, a second eccentric cylinder, a third eccentric cylinder and a fourth eccentric cylinder, which are eccentrically fixed on the rotating shaft and arranged side by side, wherein the first cycloid disc is sheathed around the first eccentric cylinder, the second cycloid disc is sheathed around the second eccentric cylinder, the third cycloid disc is sheathed around the third eccentric cylinder, and the fourth cycloid disc is sheathed around the fourth eccentric cylinder, wherein an eccentric direction of the first eccentric cylinder and an eccentric direction of the third eccentric cylinder are identical, an eccentric direction of the second eccentric cylinder and an eccentric direction of the fourth eccentric cylinder are identical, and the eccentric directions of the first eccentric cylinder and the third eccentric cylinder are opposite to the eccentric directions of the second eccentric cylinder and the fourth eccentric cylinder.

7. The cycloid speed reducer according to claim 6, wherein the first eccentric cylinder, the second eccentric cylinder, the third eccentric cylinder and the fourth eccentric cylinder of the eccentric assembly are integrally formed with the rotating shaft, wherein a radius of the second eccentric cylinder is larger than a radius of the first eccentric cylinder, and a radius of the third eccentric cylinder is larger than a radius of the fourth eccentric cylinder.

8. The cycloid speed reducer according to claim 6, wherein at least two eccentric cylinders of the first eccentric cylinder, the second eccentric cylinder, the third eccentric cylinder and the fourth eccentric cylinder are assembled with the rotating shaft, and the other eccentric cylinders are integrally formed with the rotating shaft.

9. The cycloid speed reducer according to claim 8, wherein the at least two eccentric cylinders of the first eccentric cylinder, the second eccentric cylinder, the third eccentric cylinder and the fourth eccentric cylinder are assembled with and fixed on the rotating shaft through corresponding coupling pins, and the other eccentric cylinders are integrally formed with the rotating shaft.

10. The cycloid speed reducer according to claim 4, wherein the number of the at least one first outer tooth of the first cycloid disc is equal to the number of the at least one second outer tooth of the second cycloid disc, and the number of the at least one third outer tooth of the third cycloid disc is equal to the number of the at least one fourth outer tooth of the fourth cycloid disc, wherein a tooth profile of the at least one first outer tooth of the first cycloid disc matches a tooth profile of the at least one second outer tooth of the second cycloid disc, and a tooth profile of the at least one third outer tooth of the third cycloid disc matches a tooth profile of the at least one fourth outer tooth of the fourth cycloid disc.

11. The cycloid speed reducer according to claim 1, wherein the second cycloid disc and the third cycloid disc are fixed on each other, the first cycloid disc further comprises plural connecting parts, the second cycloid disc further comprises plural first perforations, and the third cycloid disc further comprises plural second perforations, wherein the connecting parts are penetrated through the corresponding first perforations and the corresponding second perforations, so that the first cycloid disc and the fourth cycloid disc are connected with each other.

12. The cycloid speed reducer according to claim 11, wherein the connecting parts are separated from peripheries of the corresponding first perforations and second perforations, wherein the connecting parts are trapezoidal prisms, and the first perforations and the second perforations have trapezoidal profiles, or the connecting parts are cylindrical posts, and the first perforations and the second perforations have circular profiles.

13. The cycloid speed reducer according to claim 11, wherein the eccentric assembly comprises a first eccentric cylinder, a second eccentric cylinder, a third eccentric cylinder and a fourth eccentric cylinder, which are eccentrically fixed on the rotating shaft and arranged side by side, wherein the first cycloid disc is sheathed around the first eccentric cylinder, the second cycloid disc is sheathed around the second eccentric cylinder, the third cycloid disc is sheathed around the third eccentric cylinder, and the fourth cycloid disc is sheathed around the fourth eccentric cylinder, wherein an eccentric direction of the second eccentric cylinder and an eccentric direction of the third eccentric cylinder are identical, an eccentric direction of the first eccentric cylinder and an eccentric direction of the fourth eccentric cylinder are identical, and the eccentric directions of the second eccentric cylinder and the third eccentric cylinder are opposite to the eccentric directions of the first eccentric cylinder and the fourth eccentric cylinder.

14. The cycloid speed reducer according to claim 13, wherein the first eccentric cylinder, the second eccentric cylinder, the third eccentric cylinder and the fourth eccentric cylinder of the eccentric assembly are integrally formed with the rotating shaft, wherein a radius of the second eccentric cylinder is larger than a radius of the first eccentric cylinder, and a radius of the third eccentric cylinder is larger than a radius of the fourth eccentric cylinder.

15. The cycloid speed reducer according to claim 11, wherein the number of the at least one first outer tooth of the first cycloid disc is equal to the number of the at least one second outer tooth of the second cycloid disc, and the number of the at least one third outer tooth of the third cycloid disc is equal to the number of the at least one fourth outer tooth of the fourth cycloid disc, wherein a tooth profile of the at least one first outer tooth of the first cycloid disc matches a tooth profile of the at least one second outer tooth of the second cycloid disc, and a tooth profile of the at least one third outer tooth of the third cycloid disc matches a tooth profile of the at least one fourth outer tooth of the fourth cycloid disc.

16. The cycloid speed reducer according to claim 1, wherein the eccentric directions of two eccentric cylinders of the first eccentric cylinder, the second eccentric cylinder, the third eccentric cylinder and the fourth eccentric cylinder are opposite to the eccentric directions of the other two eccentric cylinders.

* * * * *